United States Patent
Lee

(10) Patent No.: US 7,142,753 B2
(45) Date of Patent: Nov. 28, 2006

(54) LIGHT PETAL GENERATION STRUCTURE FOR OPTICAL FIBERS

(76) Inventor: Jean-Hway Lee, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/076,994

(22) Filed: Mar. 11, 2005

(65) Prior Publication Data

US 2006/0133750 A1 Jun. 22, 2006

(30) Foreign Application Priority Data

Dec. 30, 2004 (TW) .............................. 93141365 A

(51) Int. Cl.
*G02B 6/04* (2006.01)
*G02B 6/06* (2006.01)
(52) U.S. Cl. .................. 385/119; 385/115; 362/560
(58) Field of Classification Search ................ 385/100, 385/102, 115, 119, 147, 901; 362/559, 560
See application file for complete search history.

(56) References Cited

U.S. PATENT DOCUMENTS

| | | | | |
|---|---|---|---|---|
| 4,466,697 A | * | 8/1984 | Daniel | ......................... 385/123 |
| 5,432,876 A | * | 7/1995 | Appeldorn et al. | ........... 385/31 |
| 5,987,199 A | * | 11/1999 | Zarian et al. | .................. 385/31 |
| 6,104,371 A | * | 8/2000 | Wang et al. | ................. 345/102 |
| 6,289,150 B1 | * | 9/2001 | Zarian et al. | .................. 385/31 |

\* cited by examiner

*Primary Examiner*—Sung Pak
*Assistant Examiner*—Daniel Petkovsek
(74) *Attorney, Agent, or Firm*—Troxell Law Office, PLLC

(57) ABSTRACT

A light petal generation structure for optical fibers, especially applied to a decorative optical fiber, collects loss light at a nodule position, and directly transforms into an enlarged and bright light petal. The structure uses primarily an optical fiber with side losses, wherein light-dot generation grooves are opened at a cladding layer on an exterior circular surface at nodule positions. A reflection mirror facing a direction of incident light is emplaced in the generation grooves. A loss light is directly reflected by the reflection mirror, and enlarged through a curvature of a core of the optical fiber, thereby transforming into an enlarged and bright light petal on an exterior circular surface at the other side of a spun of optical fiber.

19 Claims, 14 Drawing Sheets

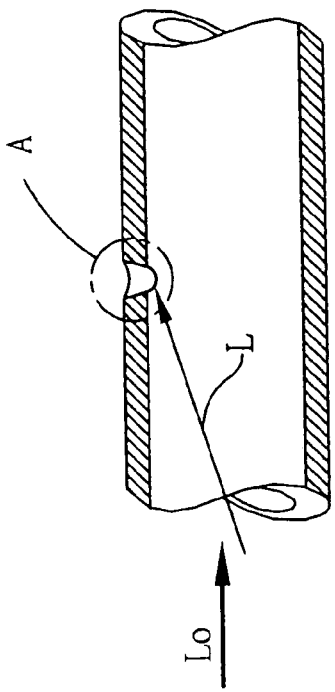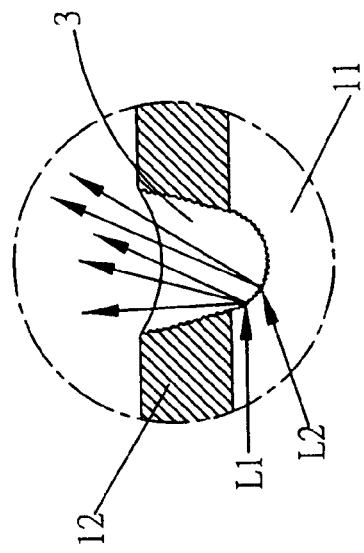
FIG.3 Prior Art
FIG. 3A Prior Art
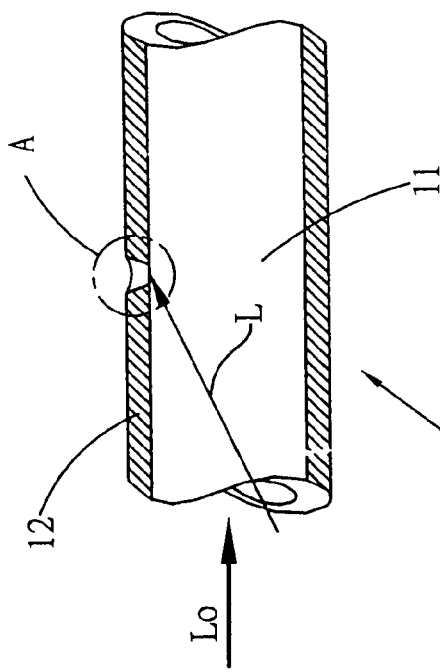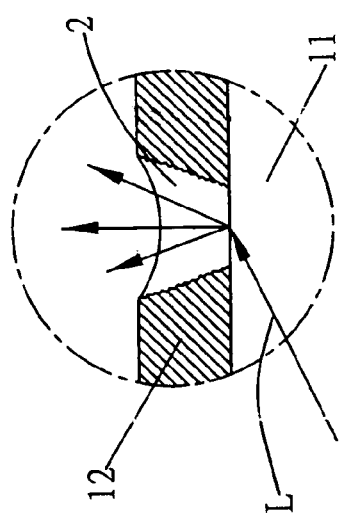
FIG.2 Prior Art
FIG. 2A Prior Art

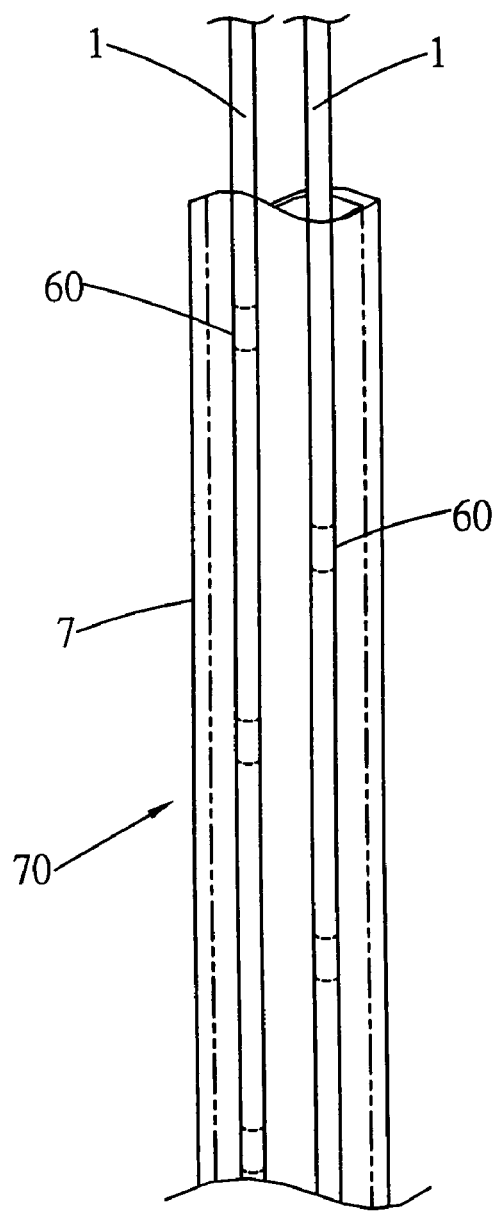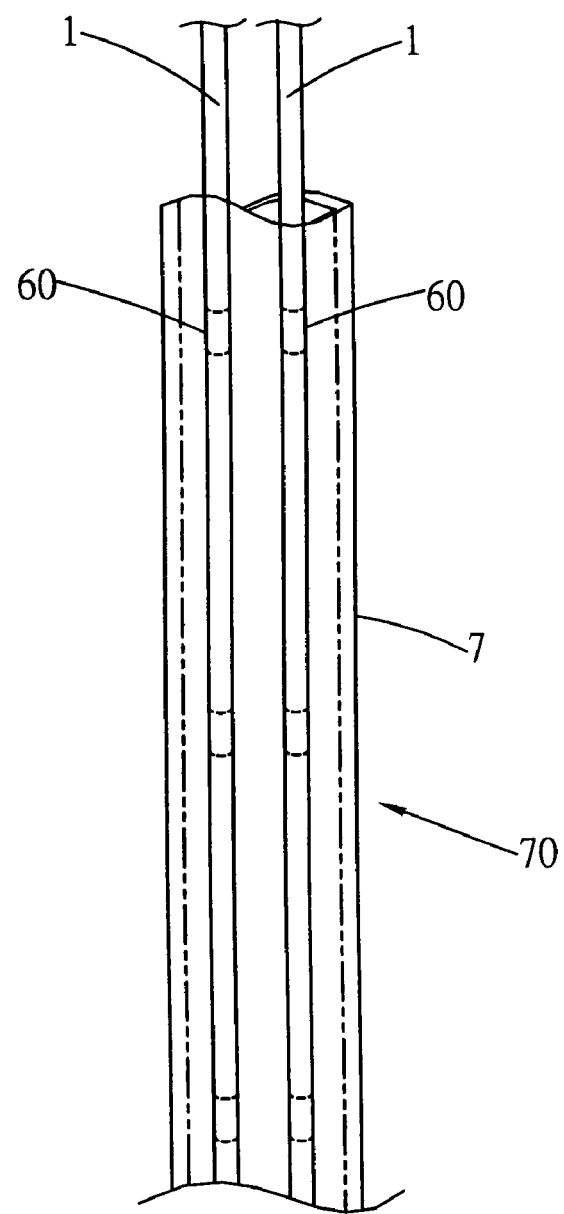
FIG. 11B                    FIG. 11C

LIGHT PETAL GENERATION STRUCTURE FOR OPTICAL FIBERS

BACKGROUND OF THE INVENTION (a) Field of the Invention

The present invention relates to a light petal generation structure for optical fibers, and more particularly to a light petal generation structure applied to decorative optical fibers wherein a loss light is collected at a nodule position on an exterior circular surface, and transformed into an enlarged and bright light petal.

The present invention uses primarily an optical fiber with side losses, wherein light petal generation grooves are installed in a cladding layer of the fiber. The light petal generation groove has a reflection mirror facing a loss light which is directly reflected via the mirror, diffused with a curvature of a core part of the fiber, and transformed into an enlarged and bright light petal through an exterior circular surface at the other side of a fiber spun. An exterior of the aforementioned fiber spun is surrounded by a transparent light diffusion sleeve, so as to safely protect and diffuse light petals, thereby homogenizing the lumen.

(b) Description of the Prior Art

Decorative optical fibers which are primarily made of plastic material have inherent features of side losses, in which a halation in a line shape is formed due to a leakage loss from an exterior circular surface after introducing an optical flow into an entire spun of optical fiber.

In order to form a brighter contrast optical flow on a surface of the aforementioned optical fiber, openings are generally put in a destructive way on the surface for emitting light. Referring to FIG. 1, an entire of a plurality of spun of optical fiber 1 form a plate in a parallel layout based on a bottom lining 10. A leakage part 102 is dug out in advance on the surface with any kind of destructive methods, such as cutting, high frequency heat fusing, acid washing, and burnishing. An area of totem of the leakage part 102 can be a flat radial surface or in a character shape according to requirement.

One end of the entire plate converges to an entry port 101. After introducing an optical flow from a light source L0 into the entry port 101 and transmitting the optical flow via the spun of fiber 1, a halation is formed on a surface of the entire plate, and then a light is forced to emit out at the leakage part 102 due to destruction. Therefore, the lumen of optical flow at the leakage part 102 will be greater than that of a halation on other circular surfaces of the spun of fiber, thereby allowing the totem to manifest an effect of strong contrast.

Referring to FIG. 2 and FIG. 2A, it shows another implementation wherein a window 2 is located at a cladding layer 12 of the spun of fiber 1. The window 2 is formed by cutting through the cladding layer 12, so as to allow a bottom of the window 2 to be adjacent to a core 11. When a beam of an incident light L from a light source L0 is close to the position of window 2, a light will be escaping from an interface, constituting a emission of light in a light-dot form through the window 2.

Referring to FIG. 3 and FIG. 3A, for a conventional way of generating a light-dot, an opening 3 is deeply emplaced into the cladding layer, wherein the opening 3 is deeply dug out such that a bottom of the opening 3 is inside the core 11, thereby forming relative dike surfaces of L1 and L2 passing through the opening 3 from the beam of incident light, and constituting a large amount of escaping light.

All of the aforementioned methods of leaking light are compulsory, and an escaping light is directly formed at a dug-out place using an incident light in the operation of digging out those openings. Therefore, a large amount of light energy can be easily lost prematurely and a transmission length can be greatly reduced in the process due to direct escaping of the light.

Referring to FIG. 4, optical fibers for decoration use which are generally made of plastic material have a side loss light L1, wherein a halation can be emitted entirely on an exterior circular surface according to a shape of circular surface of a spun of decorative fiber 1 by the loss light L1.

A general working mode of a spun of optical fiber includes introducing an incident light L0 in slant, which is reflected at a reflection interface layer 4 and then moves forward in a core 11. After irradiating the incident light L on the reflection interface layer 4, a branch light L10 which is reflected out is formed, and in turn reflected by the reflection interface layer 4, causing a projection light LN to be projected from a projection port 103.

During the process, the reflection interface layer 4 cannot reflect the light completely due to the material and structure of the core 11 and the cladding 12. Therefore, a loss light L1 which is escaping out is formed. On the other hand, a halation is also formed by the escaping of the loss light L1, thereby providing for the application to decoration.

In the conventional methods for escaping a light as described above, an opening is directly emplaced on the cladding layer 12, for directly escaping the incident light L of the core 11, which also causes the escape of a large amount of the incident light prematurely, and loses an effect of long-range transmission.

Referring to the methods of digging an opening as shown in FIG. 1 to FIG. 3, if a large area is used for the leakage part 102, the incident light will be completely lost within a very short distance, causing no light at all at an end of the optical fiber.

For the window 2 and opening 3 as shown in FIG. 2 and FIG. 3, the light escaped after emplacing the openings is only a tiny dot with diameter smaller than that of the optical fiber (not considering a scattering condition), which is not easily perceptible, especially the diameter is only about 0.75 mm for a general spun of optical fiber.

SUMMARY OF THE INVENTION

Accordingly, the present invention particularly uses a generation groove in a cladding layer to directly transform a loss light into a bright light petal. An optical flow in a core of optical fiber can be maintained at constant without extra escaping, and an enlarge effect from a curvature of cross section of the optical fiber can be employed to enlarge a reflection light to a light petal with diameter greater than that of a spun of optical fiber.

Referring to FIG. 4, it shows a definition of the loss light. A loss light flowing out is formed by passing an incident light through a reflection interface layer, as the loss light is originally a light from normal losses.

The present invention uses a generation groove in the cladding layer to capture and form a radial reflection after collecting the loss light. After enlarging the loss light through a curvature of core, a bright and enlarged light petal is formed at the other side of exterior surface of the spun of optical fiber.

Furthermore, light petals are collected at a nodule position separated by the spun of optical fiber, in order to emit a light of nodule shape with a strong contrast along a longitudinal direction of the spun of optical fiber.

To enable a further understanding of the said objectives and the technological methods of the invention herein, the brief description of the drawings below is followed by the detailed description of the preferred embodiments.

BRIEF DESCRIPTION OF THE DRAWINGS

FIG. 2 shows a view of a conventional method of emplacing a window for escaping a light-dot.

FIG. 2A shows a schematic view of escaping a light-dot through the window in FIG. 2.

FIG. 3 shows a schematic view of a conventional method of digging out an opening for escaping a light-dot.

FIG. 3A shows a schematic view of escaping a light-dot through the opening dug out in FIG. 3.

FIG. 11B shows a schematic view of mutual relation between nodules of optical fiber of the present invention.

FIG. 11C shows another schematic view of mutual relation between nodules of optical fiber of the present invention.

DETAILED DESCRIPTION OF THE PREFERRED EMBODIMENTS

Figure 1:
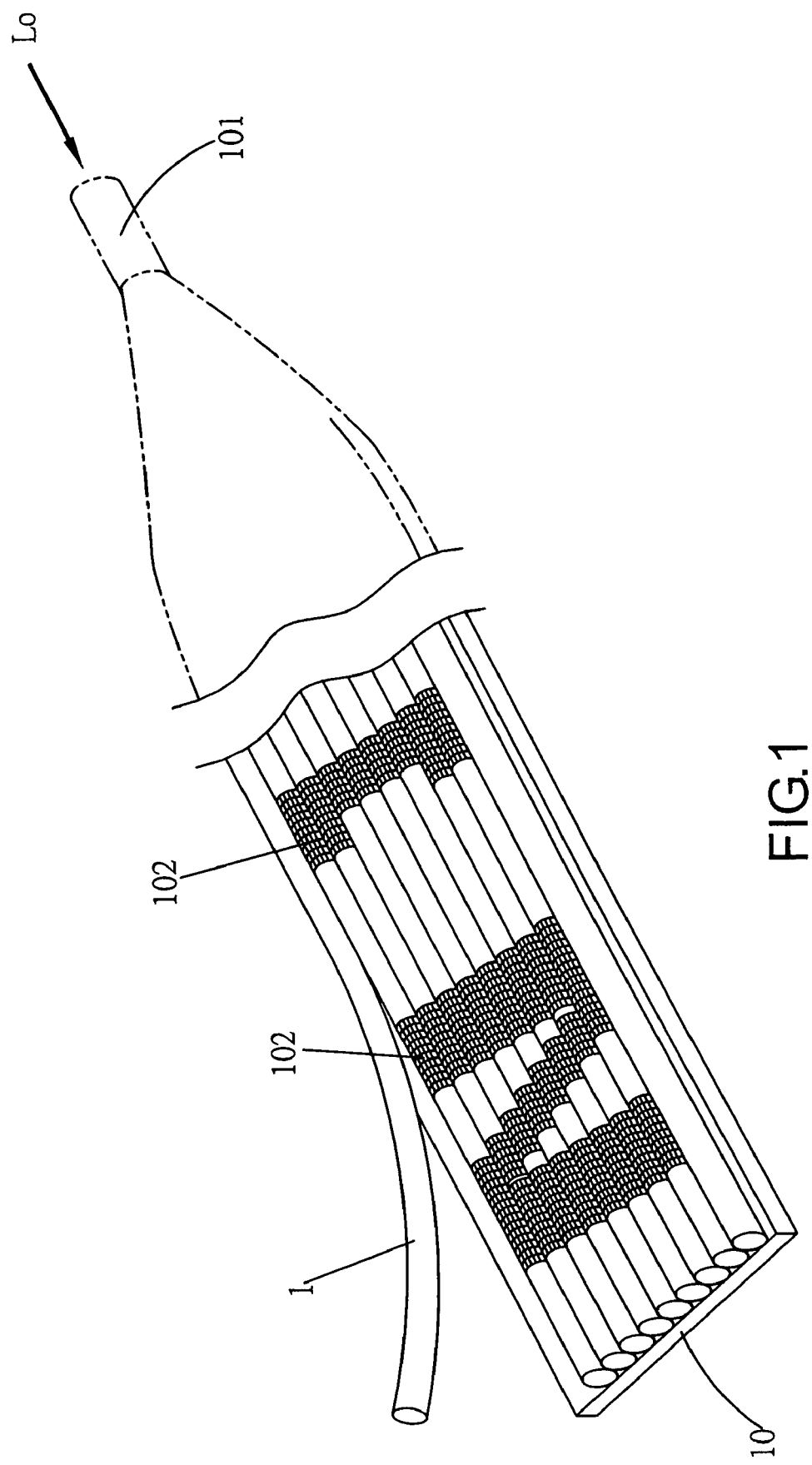
FIG. 1 shows a schematic view of implementation into a sign of a conventional decorative optical fiber.
Figure 4:
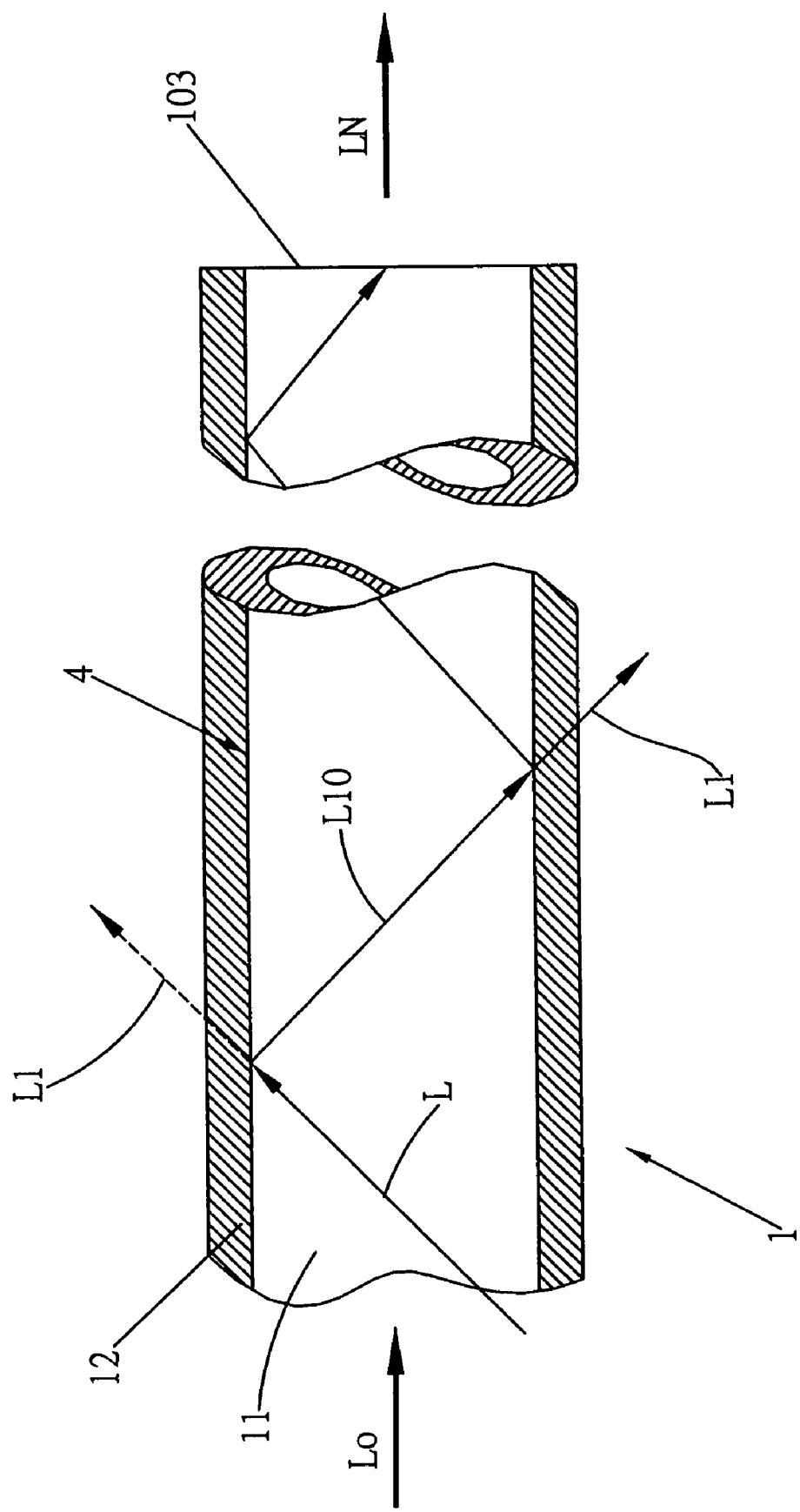
FIG. 4 shows a schematic view of a transmission of optical flow for a general optical fiber with side losses.
Figure 5A:
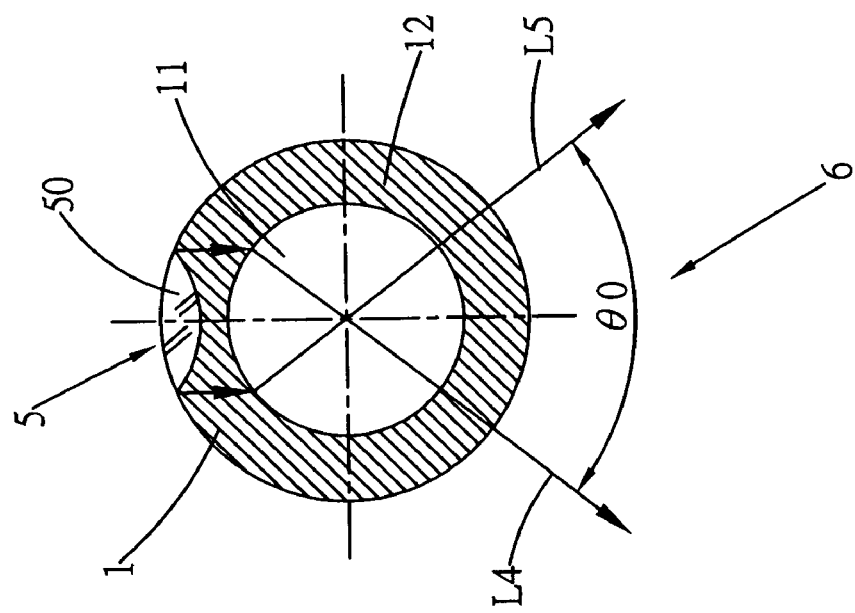
FIG. 5A shows a cross sectional view of FIG. 5.
Figure 5:
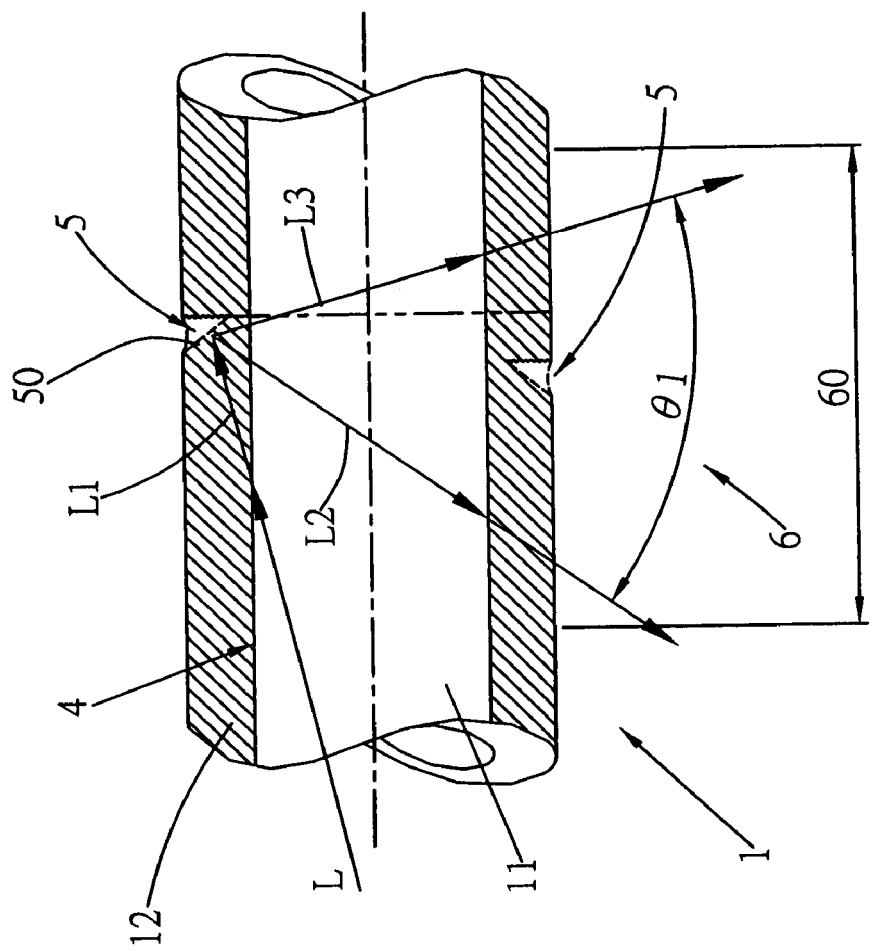
FIG. 5 shows a schematic view of a basic working principle of the present invention.

Referring to FIG. 5, a plurality of nodules 60 for escaping a light is emplaced at various sections divided along a longitudinal direction of spun of optical fiber 1. At position of each nodule 60, a light petal generation groove is deeply emplaced at a cladding layer 12 of the spun of fiber 1 in a transversal direction. Reflection mirrors 50 facing a direction of loss light are located in the light petal generation groove 5, and can be used to reflect a loss light L1 passed through via a reflection interface layer 4 of a core 11. An angle of reflection for the reflection mirrors 50 is basically required to be corresponding to that of the incident loss light L1, such that an angle of incident θ1 is formed between reflection lights L2 and L3, and transversal reflection lights L4, L5 (as shown in FIG. 5A) are multiplied with the aforementioned L2 and L3 into an area of a light petal 6, wherein the reflection lights L4 and L5 are refracted transversally with an enlarged angle of refraction θ0 via an enlarge effect by a curvature of the core 11. After reflected by the reflection mirrors 50, the reflection lights L2, L3, L4, and L5 are enlarged through the curvature of the core 11 and pass out from an exterior circular surface opposite to the location of the reflection mirrors 50, thereby forming the enlarged and bright light petal 6 at the location of passing out. Apparently, the width of the light petal 6 is visually much greater than a diameter of the spun of fiber 1.

As the reflection mirrors 50 are locally emplaced inside the generation groove 5, and are inside the cladding layer 12, such that after receiving a projection of the loss light L1 of an incident light L, an optical flow will be directed into the core 11 via the cladding layer 12, and be enlarged into the angle of refraction θ0 through a curvature refraction of the core 11.

As the angle of refraction θ0 is defined by the refracted lights L4 and L5, the angle of incident θ1 can be formed in a longitudinal direction of the spun of fiber 1, via the reflection mirrors 50, and is multiplied with the enlarged angle of refraction θ0 in a radial direction of cross section of the optical fiber into the bright light petal 6. The light petal 6 is formed by emitting a reflection light on an exterior circular surface opposite to the generation groove 5, after enlarging by the curvature of core 11.

The aforementioned generation groove 5 is opened at a position of nodule 60 divided by the spun of fiber 1, in an opposite and alternate side in a radial direction of exterior circular surface, so as to form at least two opposite generation grooves 5 alternately at same nodule 60 of the spun of fiber 1.

Light petal 6 with a shape of a wedge can be emitted at two opposite sides in a radial direction, at the position of same nodule 60, by using the opposite generation grooves 5 (as shown in FIG. 5), such that the light petals 6 can be observed at front or rear position of the nodule 60. If the angles of refraction of the light petals 6 are all close to 180 degrees, a light ring can be constructed with an addition of a scattering light. The aforementioned generation grooves 5 are emplaced alternately along a longitudinal direction of the spun of fiber, in order to maintain a mechanical strength of the spun of fiber. The dimension of separation between the grooves should be that allowing a light close to a shape of a ring to be constructed by two light petals 6.

If the angle of refraction θ0 of a light petal 6 cannot construct a light ring, more opposite generation grooves 5 can be emplaced at same position, such as three opposite generation grooves 5 emplaced alternately with a 120 degrees of radiant angle.

If a requirement of a light decoration is only for a single direction, and for simplifying a production procedure and lowering a cost, a line of generation grooves 5 (not shown in the drawings) can be emplaced on an exterior circular surface along a same longitudinal direction of the spun of fiber. Therefore, a line of light petals 6 is emitted at the other side of the spun of fiber, serving as a decoration of single side lightening.

Figure 6:
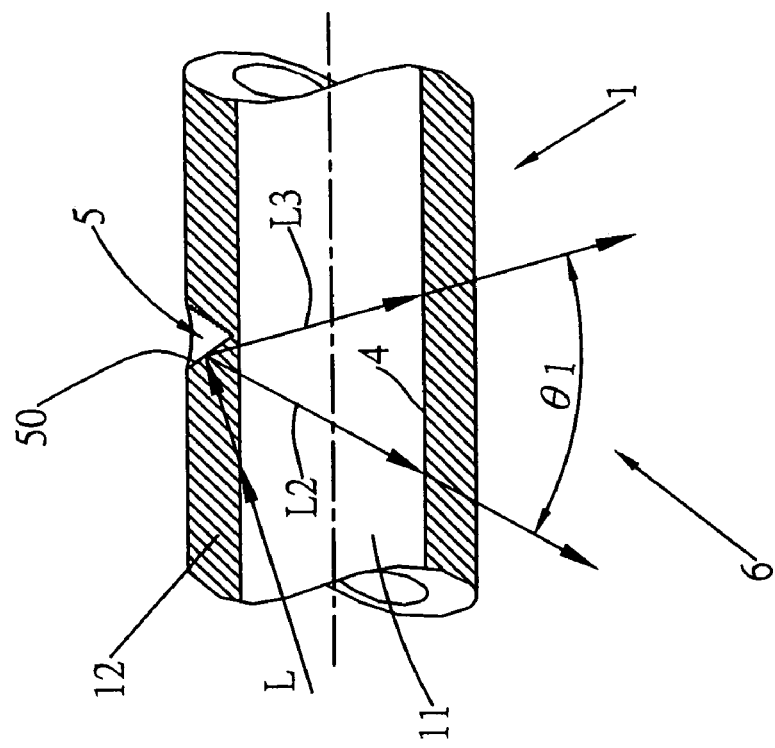
FIG. 6 shows a functional diagram of a reflection mirror of the present invention.

Referring to FIG. 6, if the reflection mirrors 50 emplaced in the generation groove 5 are apparently facing the incident light L in a slant direction, the reflection lights L2 and L3 forming the angle of incident θ1 can be distributed close to the direct bottom of the generation groove 5, such that the reflection light L3 apparently crosses over the direct bottom of the generation groove 5, thereby facilitating the prediction of position of the light petals 6, upon implementing.

Figure 7:
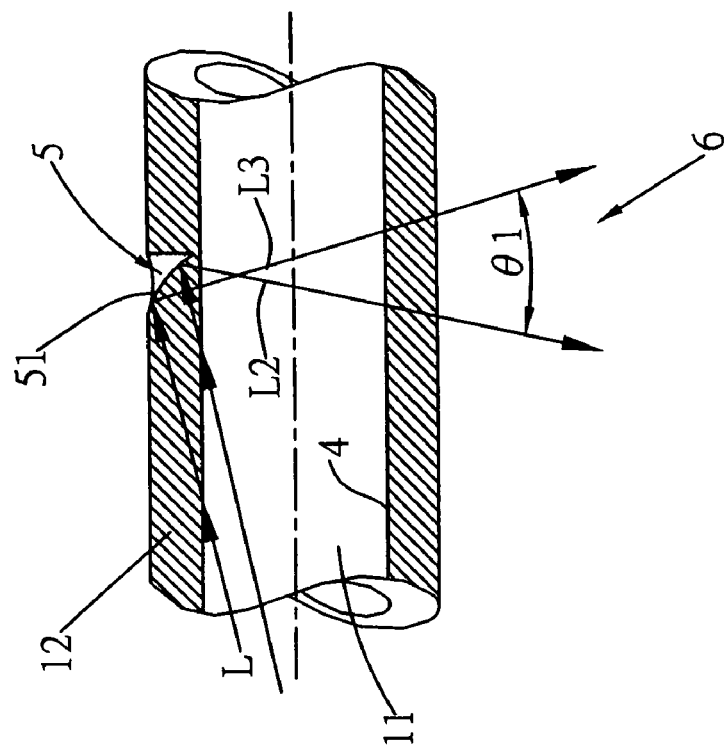
FIG. 7 shows a schematic view of another implementation of a reflection mirror of the present invention.

Referring to FIG. 7, an arc-shaped reflection mirror 51 can be emplaced in the generation groove 5 to face the incident light L, in order to focus the reflection of the incident light L introduced in various angles, so as to form a narrower angle of incident θ1, reduce the area of light petals 6, and increase the lumen.

Figure 8:
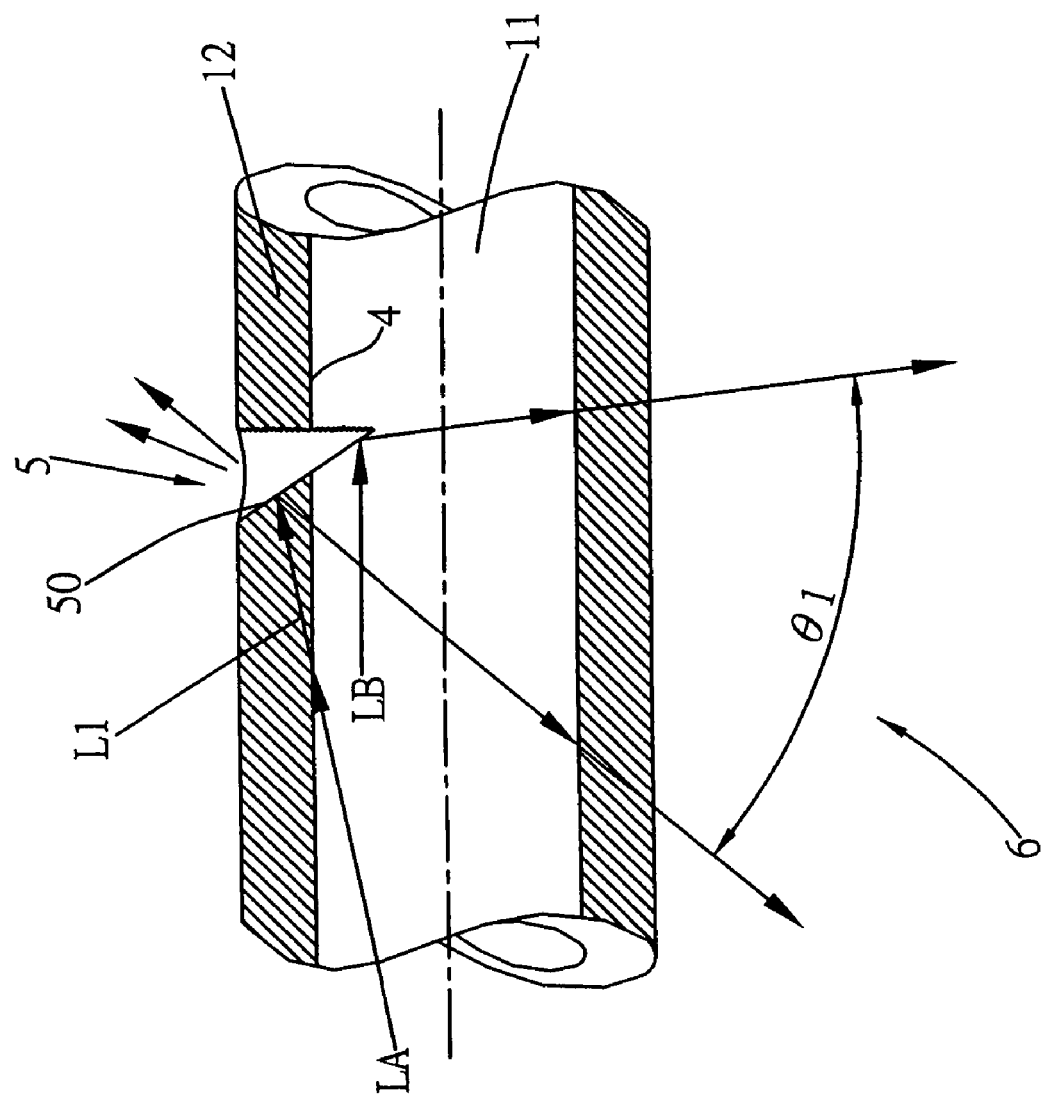
FIG. 8 shows a schematic view of emplacing a generation groove of the present invention.

Referring to FIG. 8, under a condition without a necessity of considering a length of light transmission, the generation groove 5 can be deeply emplaced into the core 11, so as to directly reflect an incident light LB which directly receives larger energy from the core 11, and simultaneously reflect a loss light L1 formed by an incident light LA, thereby simultaneously reflecting two incident lights L1 and LB with different intensities of optical flow, and forming an enlarged and very bright light petal 6 with an angle of incident θ1.

Figure 9:
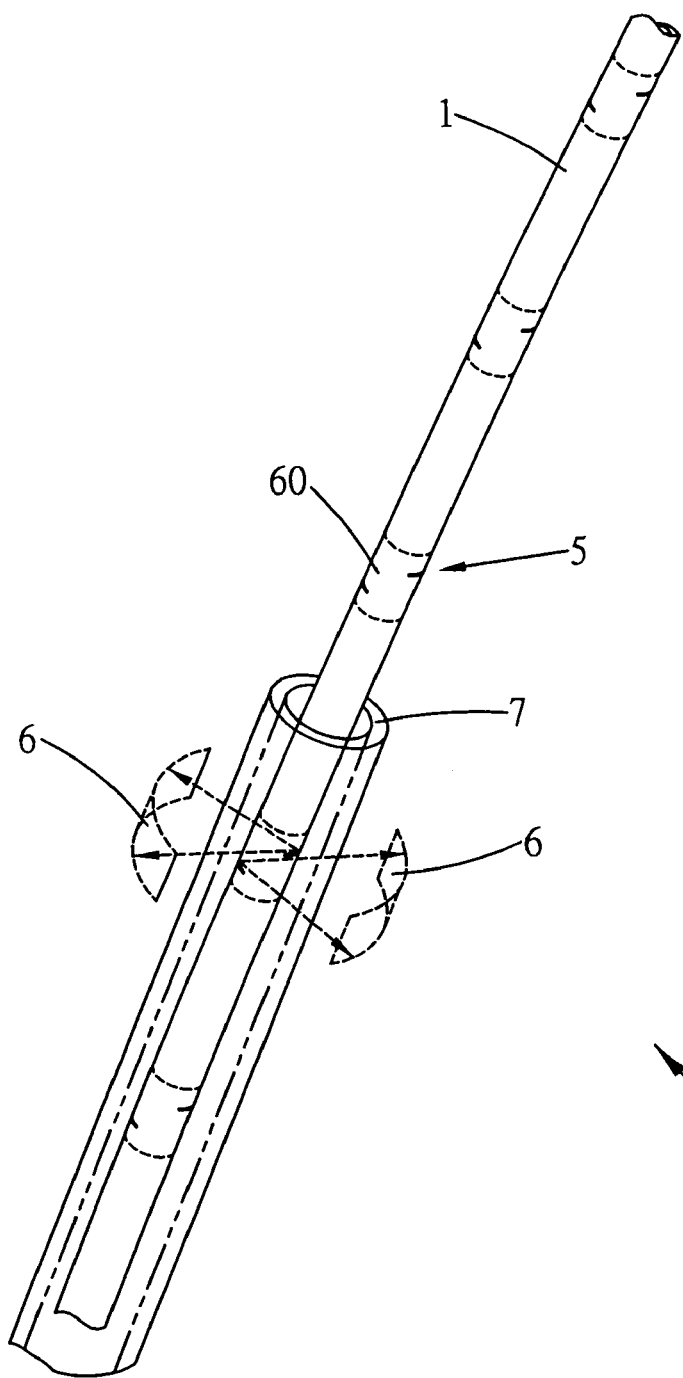
FIG. 9 shows a schematic view of an entire implementation of the present invention.
Figure 9A:
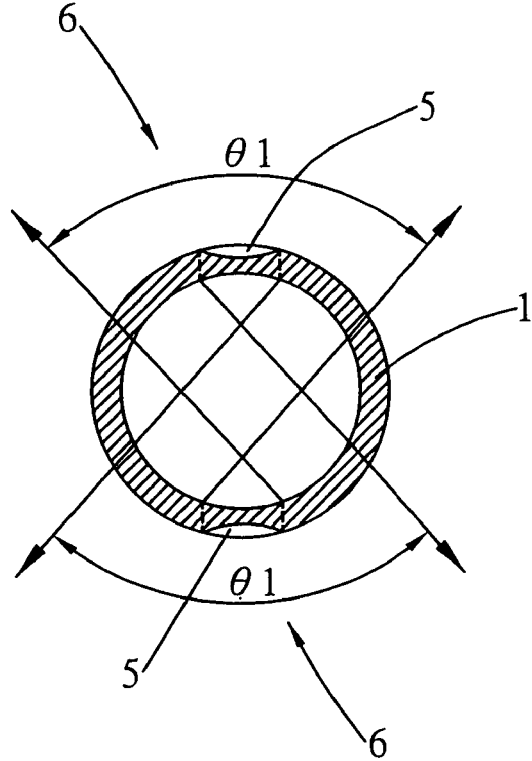
FIG. 9A shows a cross sectional view of FIG. 9.

Referring to FIG. 9, according to an implementation of the present invention, a plurality of light emitting nodules 60 is selectively and intermittently emplaced on a spun of fiber optics in a longitudinal direction, with more than one light-dot generation groove on each nodule 60. The generation groove (as shown in FIG. 9A) is used for emitting a light petal 6 at two opposite sides in a front and rear part of the spun of fiber 1. Moreover, as the generation grooves 5 are in a shape of straight line, area of light emitting for light petals 6 reflected are also in a shape of wide and flat wedge. Therefore, the design of generation grooves at alternate sides can assist the light petals 6 to form a light ring. The aforementioned concept can be further used to open a plurality of generation grooves with identical radiant angles, so as to make the light ring more noticeable.

A transparent sleeve 7 with a light diffusion function can be employed to an exterior of a spun of optical fiber 1 with the generation grooves 5 of the aforementioned implementation, in order to further homogenize the lumen of light petals 6 emitted, and prevent the spun of fiber 1 from dust and contamination with the protection of sleeve 7.

On the other hand, a mist finishing can be further applied to an inner circular surface 71 of the sleeve 7, or a material of multiple reflection and misty transparency can be selected for the sleeve 7, such that an optical flow passed through is reflected with multiple angles by a misty surface, thereby further forcing the homogeneity of the lumen of the light petals 6.

Figure 10:
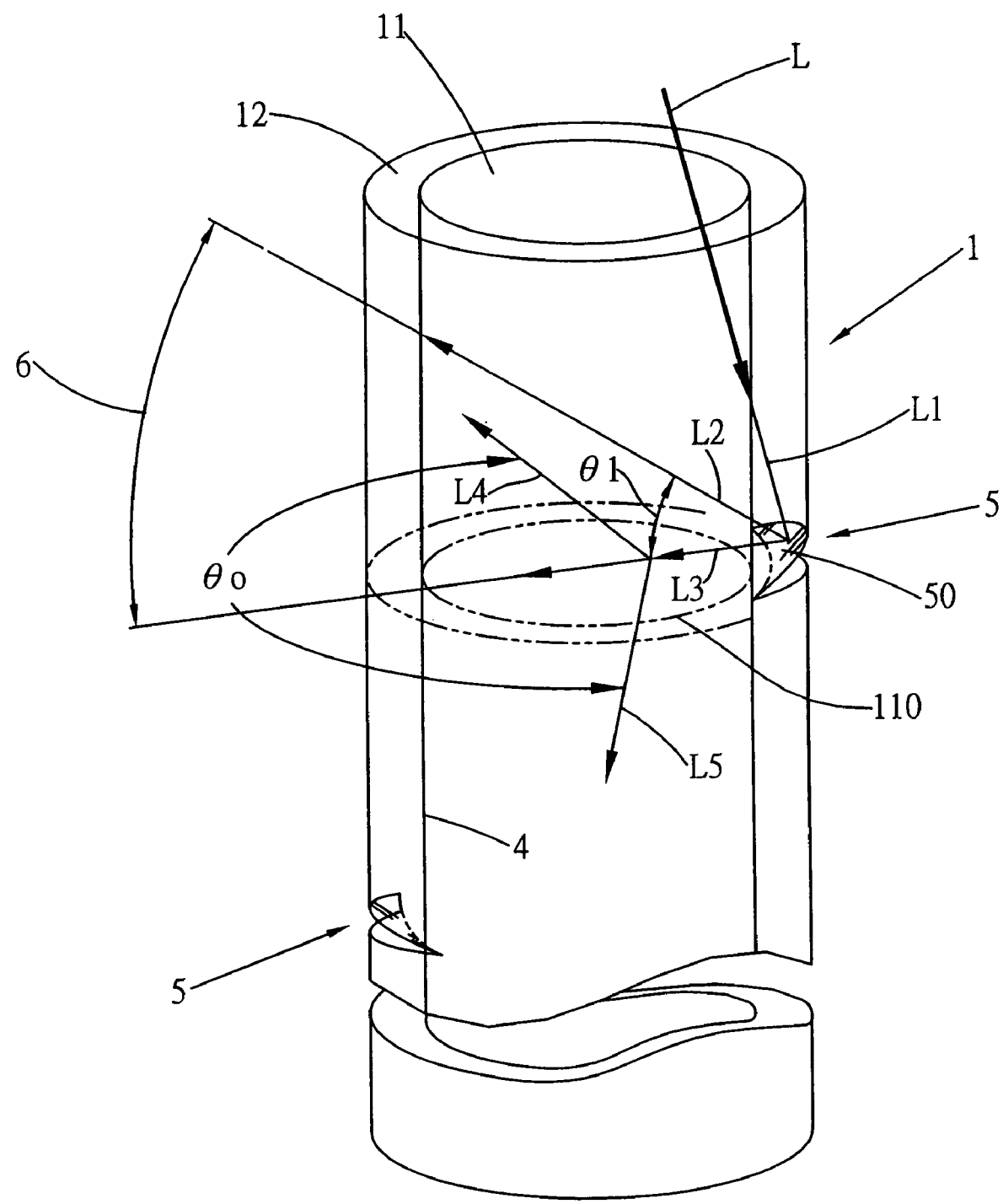
FIG. 10 shows a schematic view of forming a light petal of the present invention.

The formation of light petals 6 can be easily understood by referring to FIG. 10. After an incident light L enters a cladding layer 12 through a core 11 and a reflection interface layer 4, a loss light L1 is formed, which is directly reflected by a reflection mirror 50 emplaced in a generation groove 5. Therefore, the concept of the present invention is to transform the loss light L1 into a light petal 6.

The transformation method involves that after the loss light L1 reaches the reflection mirror 50, a longitudinal and divergent angle of incident θ1 is formed according to a spun of optical fiber 1, based on the angle of the incident light L, coupled with a horizontal angle of refraction θ0 formed by an optical flow reflected by the reflection mirror 50. Refraction lights L4 and L5 are formed and enlarged by a refraction effect from a virtual curvature of a core 11. By multiplying the horizontal angle of refraction θ0 with the angle of incident θ1 formed by the reflection lights L2 and L3, an enlarged light petal 6 in a wedge shape is reflected out on an exterior circular surface at the other side of the spun of fiber 1.

The process of emitting a light petal 6 can be shown from FIG. 10, wherein the generation groove 5 and light petal 6 are at a mutually opposite location at two sides of the spun of fiber 1, with the emplacement of another generation groove 5 at the other side.

In addition, the present invention is based on an effect of reflection mirror 50 emplaced in a generation groove 5 to directly collect a loss light L1 emitted in a normal state of loss, and use for reflection. The basic concept lies in the direct transformation of the loss light L1 into the light petal 6, which is totally different from a conventional leakage method of forcing a light to be emitted at an opening selected. Therefore, there will be no extra requirement for an optical flow transmitted from the core 11, that is, the amount of light transmission of the core 11 will not be affected. From a test of the present invention, it is found that an effective line pitch of light transmission of the core 11 is the same as that without an implementation of the present invention.

Figure 11:
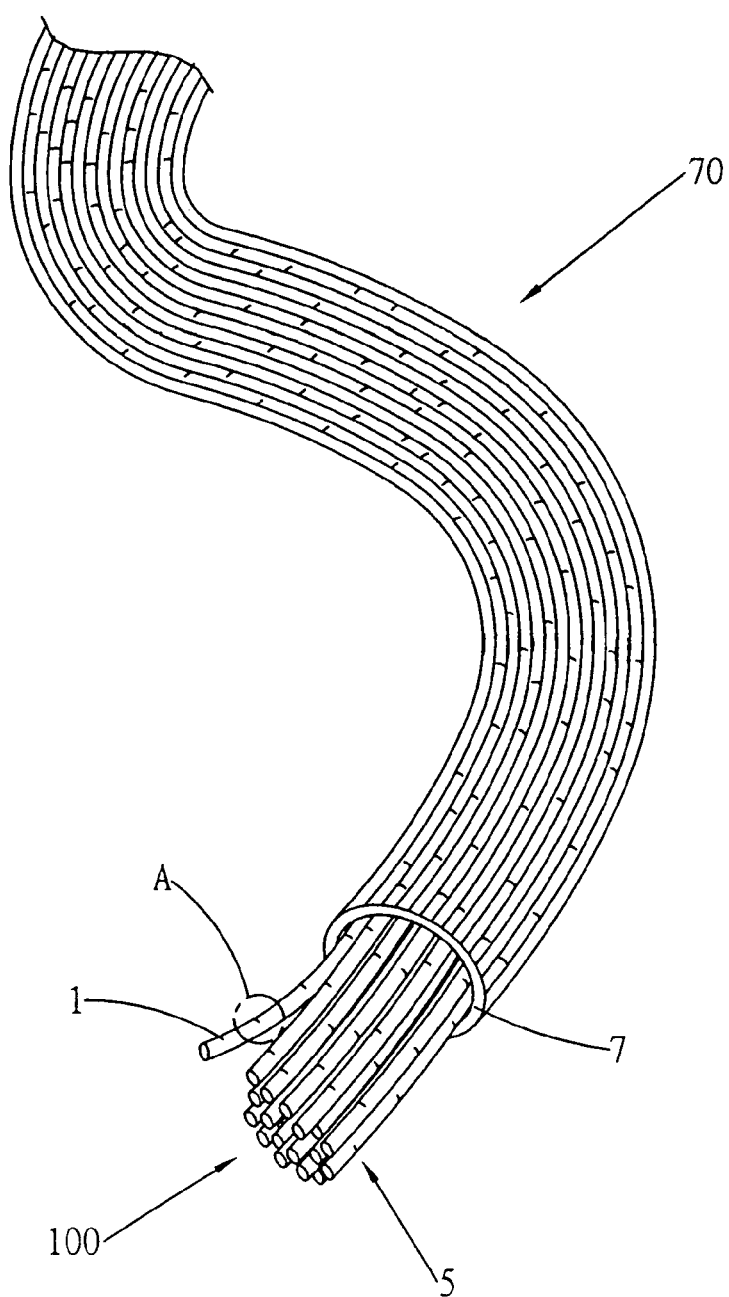
FIG. 11 shows a schematic view of another implementation of the present invention.
Figure 11A:
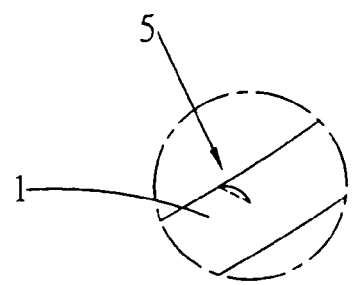
FIG. 11A shows an exploded view of a generation groove emplaced on a single spun of optical fiber.

Referring to FIG. 11 and FIG. 11A, it shows a further implementation of the present invention. A bundle of optical fiber 100 can be formed by collecting every spun of optical fiber 1 with generation grooves 5 into a bundle. A transparent sleeve 7 is used to surround the bundle of optical fiber 100, thereby constituting an optical cable 70.

With a protection of the sleeve 7 of the optical cable 7, an exterior surface of the spun of fiber 1 can be prevented from damage, thereby achieving an implementation of another type of decorative optical cables.

Referring to FIG. 11B, an optical cable 70 can have more intensive light emitting nodules 60 by collecting a plurality of optical spun 1 inside the sleeve 7 with alternate light emitting nodules 60 located longitudinally at every optical spun 1. In addition, the entire optical cable 70 can constitute a lightening of a plurality of dot-shape nodules according to the situation of a plurality of optical spun 1.

Referring to FIG. 11C, an optical cable 70 can constitute a lightening of concentrated sections by collecting a plurality of optical spun 1 inside the sleeve 7 with light emitting nodules 60 to be almost aligned longitudinally, such that the optical cable formed by a plurality of optical spun 1 can emit a large quantity of light at positions of nodule-shape sections. This implementation can simulate a dot-shape light decoration of a Christmas tree, and without electricity, so as to obtain a safe and positive benefit in applications to Christmas tree decorations.

Figure 12:
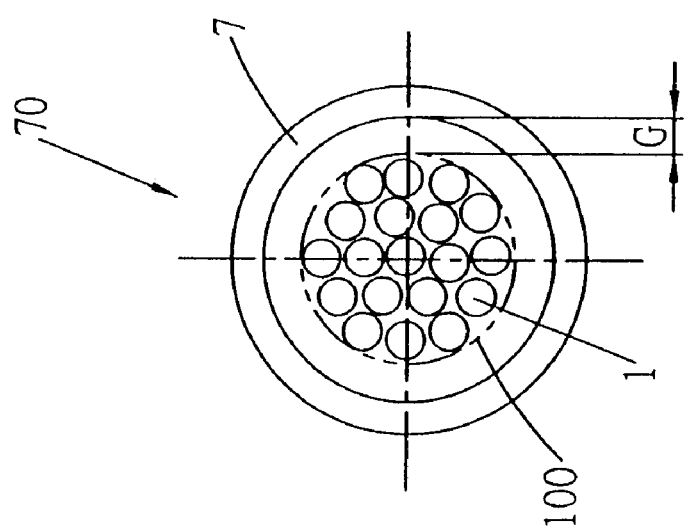
FIG. 12 shows a cross sectional view of FIG. 11.

Referring to FIG. 12, it shows the condition where a bundle of optical fiber 100 is installed inside an optical cable 70. A gap G is maintained between an exterior circular surface of the bundle of fiber 100 and an inner circular surface of the sleeve 7.

The gap G is used to absorb a change of relative displacement of a curvature upon bending and laying out the optical cable 70, so as to prevent a friction between the spun of fiber 1 of the bundle of optical fiber 100 at circular surface in the process of bending, and to prevent a strong friction between the spun of fiber and an inner circular surface of the sleeve 7.

Figure 13:
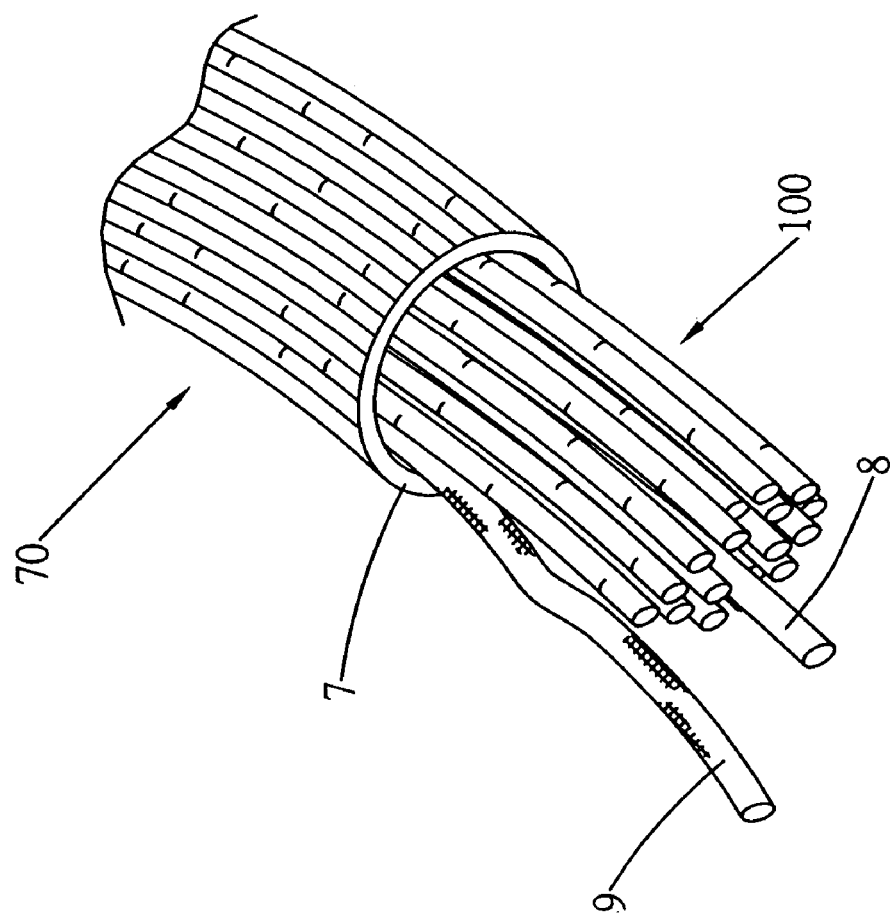
FIG. 13 shows a schematic view of a further implementation of FIG. 11.

Referring to FIG. 13, an optical cable 70 is formed by surrounding an aforementioned bundle of optical fiber 100 with a sleeve 7. A supporting wire 8 can be installed at a same longitudinal location as the bundle of fiber 100. The supporting wire 8 is made of metal and With an intensity that can be bended by a bare hand, in order to assist in the bending into formation upon decorating and laying out the optical cable 70. On the other hand, the supporting wire 8 can also be used for drawing and positioning, so as to draw the optical cable 70 into a layout of straight line.

A flexible drag wire 9 can be further employed in drawing the optical cable into a straight line.

Figure 14:
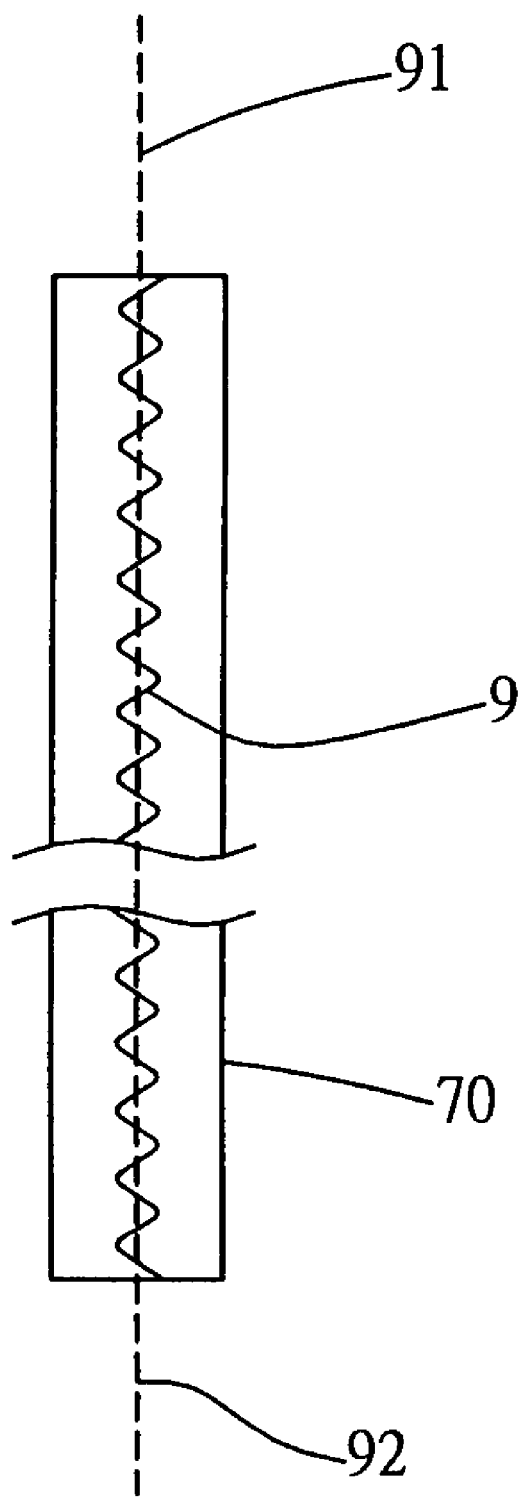
FIG. 14 shows a schematic view of installing a drag wire of an optical fiber of the present invention.

Referring to FIG. 14, the drag wire 9 can be in a wave shape in the optical cable 70, so as to be pulled in straight and protruded from a front and rear end and tied into a required length, after taking a length of a unit of optical cable 70. After emplacing the wave-shaped drag Wire 9 inside the optical cable 70, the drag wire 9 can be pulled out into a straight line, exposing a front and rear end with a protruded ports 91 and 92, which can be used to tie up to fix the optical cable 70 into a straight line or a hanging-up decoration.

Figure 15:
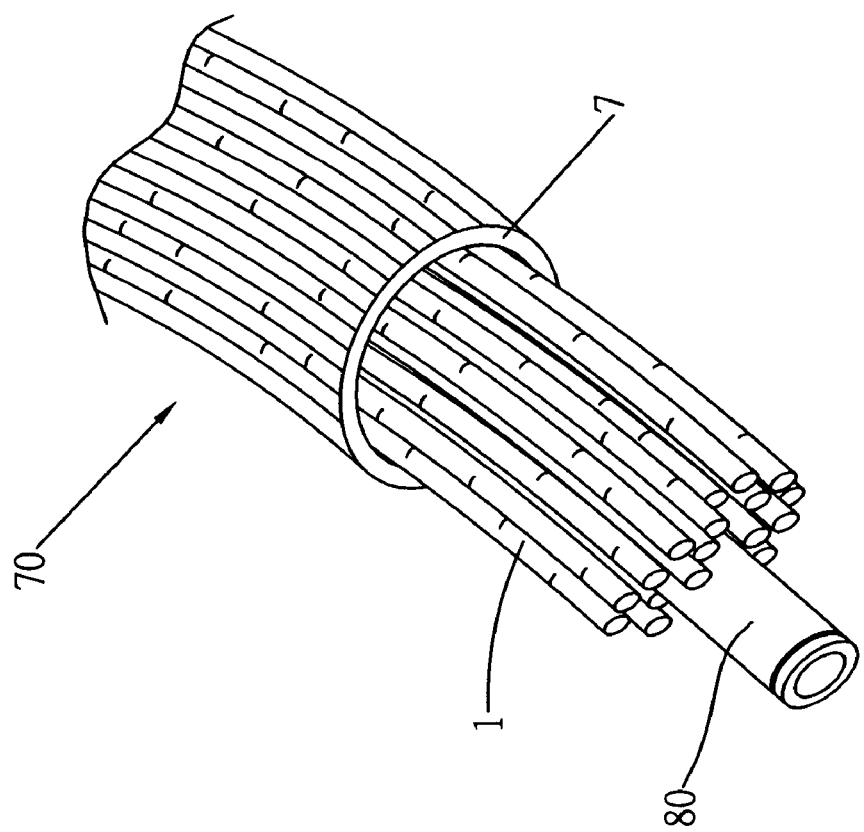
FIG. 15 shows a schematic view of yet another implementation of the present invention.

Referring to FIG. 15, it shows another implementation of the optical cable 70. An inner lining 80, a flexible tube similar to the sleeve 7, is emplaced coaxially.

Figure 16:
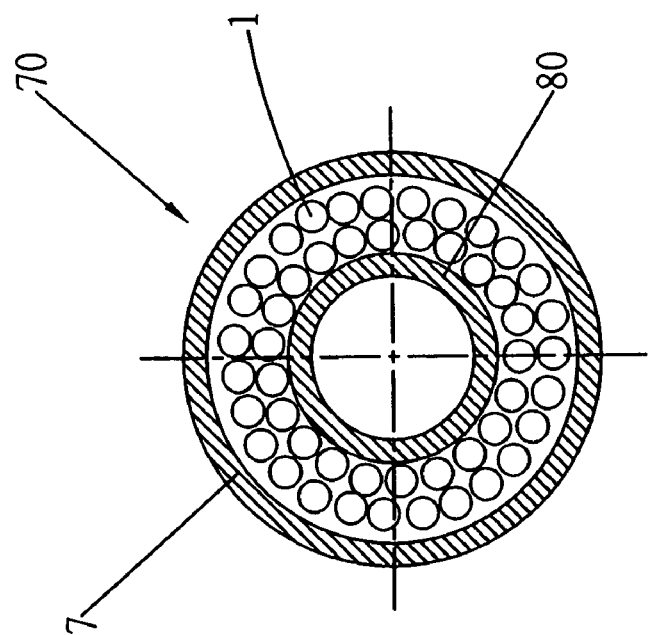
FIG. 16 shows a cross sectional view of FIG. 15.

Referring to FIG. 16, the inner lining 80 is emplaced at an inner circular surface of the sleeve 7, to serve as a function of filling, allowing the spun of fiber 1 to distribute between an exterior circular surface of the inner lining 80 and an inner circular surface of the sleeve 7, with a purpose of directly distributing the spun of fiber 1 in a space between the sleeve 7 and the inner lining 80, so as to reduce an amount of spun of fiber 1 to be laid out, and an intensity of optical flow transmitted can be adjusted according to an amount of incident of a light source, thereby causing the entire optical cable 70 to achieve a bright shining effect.

Figure 17:
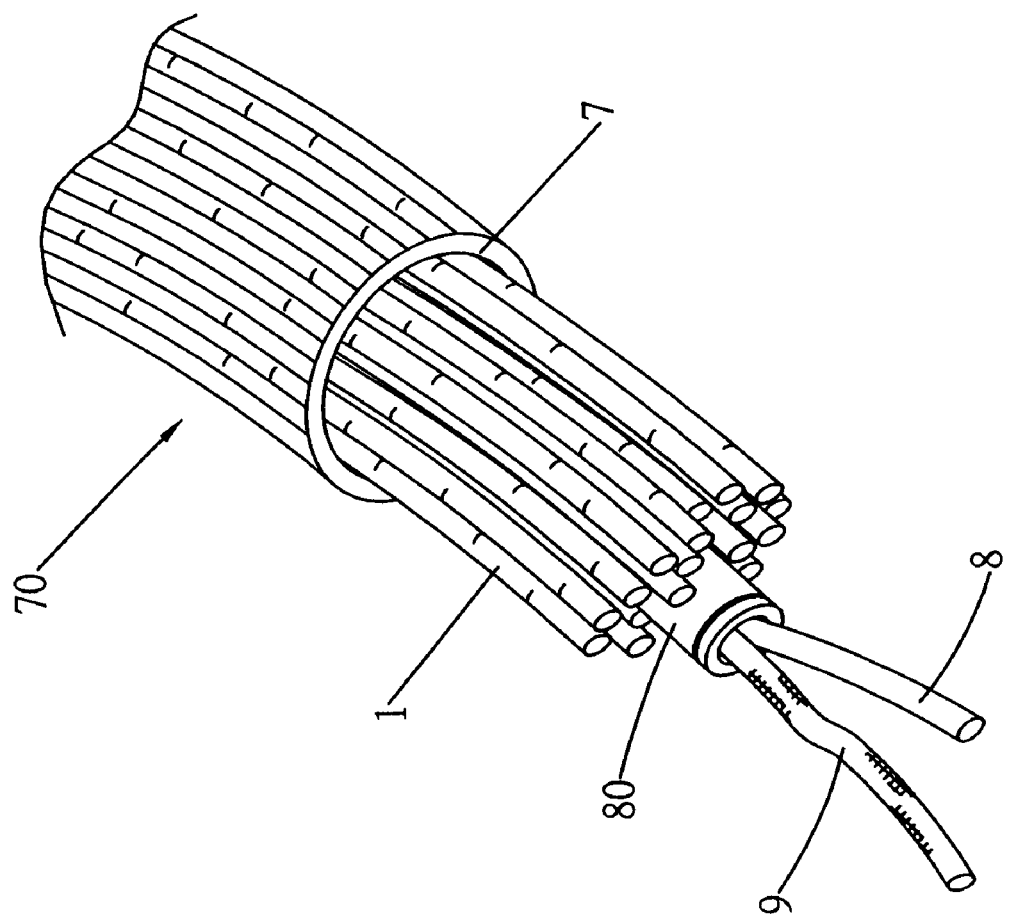
FIG. 17 shows a schematic view of a further implementation of FIG. 15.

Referring to FIG. 17, after installing the inner lining 80 inside the optical cable 70, the aforementioned metallic supporting wire 8 and drag wire 9 which can still be in a wave shape can also be emplaced into a hollow space of the inner lining 80.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A light petal generation structure for optical fibers, comprising:
    a rod-shaped spun of fiber with side losses;
    a plurality of light emitting nodules intermittently spaced apart along a longitudinal direction of the spun;
    a plurality of light-dot generation grooves opened at a location of each nodule on an exterior surface of a cladding layer of the fiber;
    reflection mirrors facing a direction of incident light and located to reflect light towards the light-dot generation grooves; and
    a protective transparent sleeve surrounding all of an exterior surface of the spun of fiber, the protective transparent sleeve being configured to diverge light in a radial direction, wherein both the grooves and mirrors are configured to generate decorative light petals by emitting and diffusing reflected light from the grooves.

2. The light petal generation structure for optical fibers according to claim 1, wherein a mist finishing is performed on an inner circular surface of the transparent sleeve.

3. The light petal generation structure for optical fibers according to claim 1, wherein a depth of the generation groove is smaller than a thickness of the cladding layer.

4. The light petal generation structure for optical fibers according to claim 1, wherein a depth of the generation groove is equal to a thickness of the cladding layer.

5. The light petal generation structure for optical fibers according to claim 1, wherein a depth of the generation groove extends into a core of the spun of fiber.

6. The light petal generation structure for optical fibers according to claim 1, wherein the generation groove is in a shape of V.

7. The light petal generation structure for optical fibers according to claim 1, wherein the reflection mirror emplaced in the generation groove is an arc-shaped mirror.

8. The light petal generation structure for optical fibers according to claim 1, wherein at least two light-dot generation grooves are emplaced at opposite sides in a radial direction through a center of the spun of the optical fiber, in a nodule section of the spun of the optical fiber.

9. The light petal generation structure for optical fibers according to claim 1, wherein at least two light-dot generation grooves are emplaced at opposite sides in a radial direction and at alternate and diagonally opposing positions in a longitudinal direction, through a center of the spun of the optical fiber, in a nodule section of the spun of optical fiber.

10. The light petal generation structure for optical fibers according to claim 1, wherein a straight line of generation grooves at alternate positions are emplaced at a same longitudinal position as an outer circumference of the spun of fiber in each nodule location.

11. The light petal generation structure for optical fibers according to claim 1, wherein after collecting a plurality of the spuns of fiber with generation grooves into a bundle, a transparent sleeve surrounds an exterior of the bundle to form a decorative optical cable.

12. The light petal generation structure for optical fibers according to claim 11, wherein the nodules of the bundles of the optical spun are at alternate positions relative to neighboring nodules in a longitudinal direction.

13. The light petal generation structure for optical fibers according to claim 12, wherein the nodules of the bundles of the optical spun are substantially aligned with neighboring nodules in a longitudinal direction.

14. The light petal generation structure for optical fibers according to claim 11, wherein a supporting wire is emplaced longitudinally inside the optical cable.

15. The light petal generation structure for optical fibers according to claim 11, wherein a drag wire is emplaced longitudinally inside the optical cable.

16. The light petal generation structure for optical fibers according to claim 11, wherein an inner lining is first installed in the sleeve, and a plurality of the spun of fibers are distributed between an exterior circular surface of the inner lining and an inner circular surface of the sleeve.

17. The light petal generation structure for optical fibers according to claim 16, wherein a supporting wire is emplaced inside the inner lining.

18. The light petal generation structure for optical fibers according to claim 16, wherein a drag wire is emplaced inside the inner lining.

19. The light petal generation structure for optical fibers according to claim 18, wherein a drag wire emplaced inside the inner lining is in a wave shape.

* * * * *